US012563360B2

(12) United States Patent
Liebman et al.

(10) Patent No.: US 12,563,360 B2
(45) Date of Patent: Feb. 24, 2026

(54) VISUALIZING AUDITORY MASKING IN MULTITRACK AUDIO RECORDING

(71) Applicant: Northwestern University, Evanston, IL (US)

(72) Inventors: Noah L. Liebman, Chicago, IL (US); Darren R. Gergle, Chicago, IL (US); Bryan A. Pardo, Evanston, IL (US)

(73) Assignee: Northwestern University, Evanston, IL (US)

( * ) Notice: Subject to any disclaimer, the term of this patent is extended or adjusted under 35 U.S.C. 154(b) by 342 days.

(21) Appl. No.: 18/170,201

(22) Filed: Feb. 16, 2023

(65) Prior Publication Data

US 2023/0300558 A1     Sep. 21, 2023

Related U.S. Application Data

(60) Provisional application No. 63/310,743, filed on Feb. 16, 2022.

(51) Int. Cl.
*G06F 3/16*        (2006.01)
*H04S 7/00*        (2006.01)
(52) U.S. Cl.
CPC ............... *H04S 7/40* (2013.01); *G06F 3/165* (2013.01)
(58) Field of Classification Search
CPC .................................. H04S 7/40; G06F 3/165
See application file for complete search history.

(56) References Cited

U.S. PATENT DOCUMENTS

| 6,430,450 B1 | 8/2002 | Bach-y-Rita et al. | |
| 2013/0144615 A1* | 6/2013 | Rauhala | H03G 3/20 |
| | | | 381/107 |
| 2019/0158052 A1* | 5/2019 | Mcclellan | H03G 5/165 |

OTHER PUBLICATIONS

Seetharaman et al., "Reverbalize: a Crowdsourced Reverberation Controller" The ACM International Conference, 2014, pp. 739-740.
Shneiderman Brian, "Direct Manipulation: a Step Beyond Programming Languages" Computer, Aug. 1983, pp. 57-69.
Silva et al., "Perceiving Graphical and Pictorial Information via Hearing and Touch" IEEE Transactions on Multimedia, Dec. 12, 2016, vol. 18, No. 12, pp. 2432-2445.
Simpson et al., "A Practical Step-by-Step to the Time Varying Loudness Model of Moore, Glasberg and Baer (1997-2002)" Audio Engineering Society Convention 134, May 4-7, 2013, pp. 1-7.
Soundgirls, "F.A.Q.s" https://soundgirls.org/about-us/soundgirtls-org-f-a-q-s/, 2019.
Spotify, "Mastering & Loudness—FAQ-Spotify for Artists" https://artists.spotify.com/faq/mastering-and-loudness, 2020.
Suzuki et al., "Equal-loudness-level contours for pure tones" Journal of the Acoustical Society of America 2004, vol. 116, pp. 918-933.

(Continued)

Primary Examiner — Joseph Saunders, Jr.
(74) Attorney, Agent, or Firm — Benesch Friedlander Coplan & Aronoff LLP

(57)        ABSTRACT
In certain aspects, a method includes receiving a plurality of audio inputs. The method includes determining masking of each audio input of the plurality of audio inputs. The method includes displaying the partial loudness and the masking of each audio input of the plurality of audio inputs in a time domain. Systems and machine-readable media are also provided.

17 Claims, 10 Drawing Sheets

(56)　　　　　References Cited

OTHER PUBLICATIONS

Swettenham , Richard, "Console Design for the Eighties" Central-ized Control of Outboard Electronics Recording Engineer/Producer, Aug. 1981, vol. 12, No. 4, pp. 17-26.

Swettenham, Richard, "Digitally Controlled Analogue Mixing 10 years on" Studio Sound and Broadcast Engineering, Apr. 1991, pp. 29-34.

Tufte, Edward, T., "Envisioning Information" Graphic Press, https://books.google.com/books?id=e!%grgEACAAJ, 1995.

Victor, Bret, "Media for Thinking the Unthinkable, Designing a new medium for science and engineering" Media for Thinking the Unthinkable, Nov. 29, 2013, pp. 1-4.

Wang et al., "Wiley: Computational Auditory Scene Analysis: Principles, Algorithms, and Applications" Wiley-IEEE Press, 2006, http://www.wiley.com/WileyCDA/WileyTitle/product-Cd-0471741094.html.

Ward et al., "An Efficient Time-Varying Loudness Model" IEEE Workshop on Applications of Signal Processing to Audio and Acoustics, Oct. 20-23, 2013, pp. 1-4.

Ward et al., "Multi-track mixing using a model of loudness and partial loudness" Audio Engineering Society Convention 133, Oct. 26-29, 2012, Convention paper 8693.

Ward, Matthew, O., "XmdvTool: Integrating Multiple Methods for Visualizing Multivariate Data" Proceedings of the Conference on Visualization 94, Computer Society Press, 1994, pp. 326-333.

Wichern et al., "Quantitative Analysis of Masking in Multirack Mixes using Loudness Loss" Audio Engineering Society 141st Convention, 2016, pp. 1-9.

Wilson, Hugh R., "Quantitative Models for Pattern Detection and Discrimination" Visions Models for Target Detection and Recog-nition, 1995, pp. 3-15.

Wobbrock et al., "The Aligned Rank Transform for Nonparametric Factorial Analyses Using Only Anova Procedures" Proceedings of the SIGCHI Conference on Human Factors in Computing Systems, May 7-12, 2011, pp. 143-146.

Aichinger, et al., "Describing the Transparency of Mixdowns: The Masked-to-Unmasked-Ratio" Audio Engineering Society Conven-tion, 2011, vol. 130.

Bangor et al., "An Empirical Evaluation of the System Usability Scale" International Journal of Human-Computer Interaction, Jul. 2008, vol. 24, No. 6, pp. 574-594.

Blackwell, Alan F., "The Reification of Metaphor as a Design Tool" Transactions on Computer-Human Interaction, Dec. 2006, vol. 13, No. 4, pp. 490-530.

Bostock, Mike, "D3: Data-Driven Documents" 2011, BSD, http://d3js.org.

Brooke, John, "SUS: A 'quick and dirty' usability scale" Usability Evaluation in Industry, 1996, pp. 189-194.

Buxton et al., "Iteration in the Design of the Human-Computer Interface" Proceedings of the 13th Annual Meeting, Human Factors Association of Canada, 1980, pp. 72-81.

Card et al., "The Psychology of Human-Computer Interaction" Lawrence Erlbaum Associates, 1983.

Carrascal et al., "Multitouch Interface for Audio Mixing" Proceed-ings of the International Conference on New Interfaces for Musical Expression, May 30-Jun. 1, 2011, pp. 100-103.

Cartwright et al., "MIXPLORATION: Rethinking the Audio Mixer Interface" The 19th International Conference, 2014, pp. 365-370.

Cleveland et al., "Graphical Perception: Theory, Experimentation, and Application to the Development of Graphical Methods" Journal of the American Statistical Association, Sep. 1984, vol. 79, No. 387, pp. 531-554.

Davis, Fred A., "Perceived Usefulness, Perceived Ease of Use and User Acceptance of Information Technology" MIS Quarterly, Sep. 1989, vol. 13, No. 3, pp. 319-340.

De Man, et al., "A knowledge-engineered autonomous mixing system" Audio Engineering Society Convention 135, Oct. 17-20, 2013, Convention Paper 8961.

Dennis, Robert, "Recommended Equalization Frequencies" http:// www.recordingeq.com/Subscribe/tip/tip11258.htm, Mar. 2000.

Diamante, Vincent, "AWOL: Control Surfaces and Visualization for Surround Creation" Technical Support, http://www.apocalypsewow.com/random/diamante_awol_thesispaper.pdf.

Dostal, Martin , "User Acceptance of the Microsoft Ribbon User Interface" DNCOCOI' 10: Proceedings of the 9th WSEAS Inter-national Conference on Data Networks, Communications, Comput-ers, pp. 143-149.

Duignan, et al., Metaphors for Electronic Music Production in Reason and Live. APCHI, 2004, pp. 111-120.

Fabfilter Pro-Q 2, Jun. 2015, http://www.fabfilter.com/products/pro-q-2-equalizer-plug-in.

Fekete et al., "Intercative Information Visualization of a Million Items" Computer Society, 2002, pp. 117-124.

Fitts, Paul M., "The Information Capacity of the Human Motor System in Controlling the Amplitude of Movement" Journal of Experimental Psychology, 1992, vol. 121, No. 3, pp. 262-269.

Fletcher et al., "Loudness, Its Definition, Measurement and Calcu-lation" The Journal of the Acoustical Society of America, 1933, vol. 5, pp. 82-108.

Ford, et al., "MixViz: a Tool to Visualize Masking in Audio Mixes" Audio Engineering Society Convention 139, Oct. 29-Nov. 1, 2015, http://music.cs.northwestern.edu/publications/FordCartwrightPardo_AES2015.pdf.

Friedman, Milton, "The Use of Ranks to Avoid the Assumption of Normality Implicit in the Analysis of Variance" Journal of the American Statistical Association, 1937, vol. 32, No. 200, pp. 675-701.

Gaver , William, W., "The SonicFinder: an Interface That Uses Auditory Icons" Human-Computer Interaction, 1989, vol. 4, pp. 67-94.

Geier et al., "Spatial Audio with the SoundScape Renderer" 27th Tonmeistertagung-VDT International Convention, Nov. 2012, http://spatialaudio.net/ssr.

Glasberg et al., "A Model of Loudness Applicable to Time-Varying Sounds" Journal of the Audio Engineering Society, May 2002, vol. 50, No. 5, pp. 331-342.

Gohike et al., "Track Displays in DAW Software: Beyond Wave-form Views" Audio Engineering Society Convention 128, May 22-25, 2010, http://www.aes.org/e-lib/browse.cfm?elib=15441.

Har-Bal, "Har-Bal 3.0" http://www.har-bal.com/, Jun. 2015.

Hart et al., "NASA-TASK Load Index (NASA-TLX); 20 Years Later" Proceedings of the HUMAN Factors and Ergonomics Soci-ety 50th Annual Meeting, 2006, pp. 904-908.

Hutchins et al., "Direct Manipulation Interfaces" Human-Computer Interaction, 1985, vol. 1, pp. 311-338.

Iinternational Electrotechnical Commission, "Electroacoustics—Sound level meters—Part 1: Specifications" International Electrotechni-cal Commission, 2013.

ITU Radiocommunication Bureau, "Recommendation ITU-R BS.1770-4, Algorithms to measure audio programme loudness and true-peak audio level" International Telecommunication Union, Oct. 2015, http//search.itu.int/pages/SearchResults.aspx?k=ALL.

Izhaki, Roey, "Mixing Audio Concepts, Practices and Tools" https://www.safaribookonline.com/library/view/mixing-audio-3rd/9781317508502/xhtml/Ch01.xhtml.

Karp et al., "HaptEQ: a collaborative Tool for Visually Impaired Audio Producers" Proceedings of the 12th International Audio Mostly Conference on Augmented and Participatory Sound and Music Experiences, Aug. 23-26, 2017, pp. 1-4.

Li et al., "A computational model that recovers the 3D shape of an object from a single 2D retinal representation" Vision Research, 2009, vol. 49, pp. 979-991.

Liebman et al., "Cuebert: a New Mixing Board Concept for Musical Theatre" Proceedings of the 2010 Conference on New Interfaces for Musical Expression, 2010, pp. 1-6.

Ma et al., "Partial Loudness in Multitrack Mixing" AES 53rd International Conference, Jan. 27-29, 2014, pp. 1-9.

Manilow et al., "Simultaneous Separation and Transcription of Mixtures with Multiple Polyphonic and Percussive Instruments" In 2020 IEEE International Conference on Acoustics, Speech and Signal Processing, 2020, pp. 771-775.

(56)     References Cited

OTHER PUBLICATIONS

Mansbridge et al., "Implementation and Evaluation of Autonomous Multi-track Fader Control" Audio Engineering Society Convention 132, Apr. 26-29, 2012, Convention Paper 8588.

McDermott et al., "Music perception, pitch, and the auditory system" Curren Opinion in Neurobiology, Aug. 2008, vol. 18, No. 4, pp. 452-463.

Mixing Console History, "Mixing Console History" Jun. 2015, http://mixingconsole.org/web/main/history.

Moore et al., "A Model for the Prediction of Thresholds, Loudness, and Partial Loudness" J. Audio Engineering Society, Feb. 27, 1997, vol. 45, No. 4, pp. 224-240.

Moore, Brian C.J., "An Introduction of the Psychology of Hearing" Emerald Group Publishing Limited, 2012, pp. 1-457.

Mullenbach et al., "Exploring Affective Communication Through Variable-Friction Surface Haptics" CHI, 2014, pp. 3963-3972.

Mycroft et al., "Visually Representing and Interpreting Multivariate Data for Audio Mixing" 13th Sound and Music Computing Conference, 2016, pp. 332-337.

Neutron 3 Masking Meter, "Neutron 3 Masking Metter" 2019, https://www.izotope.com/en/products/neutron/features/masking-meter.html.

Pachet et al., "On-the-Fly Multi Track Mixing" Audio Engineering Society Convention 109, Sep. 22-25, 2000, pp. 1-11.

Parkes, Alan P. DR., "The implications of manipulable inter-medium encodings for coaching and learner modeling" IEEE Colloquium on Intelligent Tutoring Systems, 1990, pp. 8-1-8-3.

Perez-Gonzalez et al., "Automatic Gain and Fader Control fore Live Mixing" Applications of Signal Processing to Audio and Acoustics, Oct. 18-21, 2009, pp. 1-4.

Perez-Gonzalez et al., "Automatic Mixing" John Wiley & Sons, Ltd, Chichestyer, UK, 2011, pp. 523-549.

Saha, et al., "Understanding Audio Production Practices of People with Vision Impairments" ASSETS '20: The 22nd International ACM SIGACCESS Conference on Computers and Accessibility, Oct. 26-28, 2020, pp. 1-13.

* cited by examiner

500

710 — Receive a plurality of audio inputs

712 — Determine masking of each audio input of the plurality of audio inputs

714 — Display a partial loudness and the masking of each audio input of the plurality of audio inputs in a time domain

700

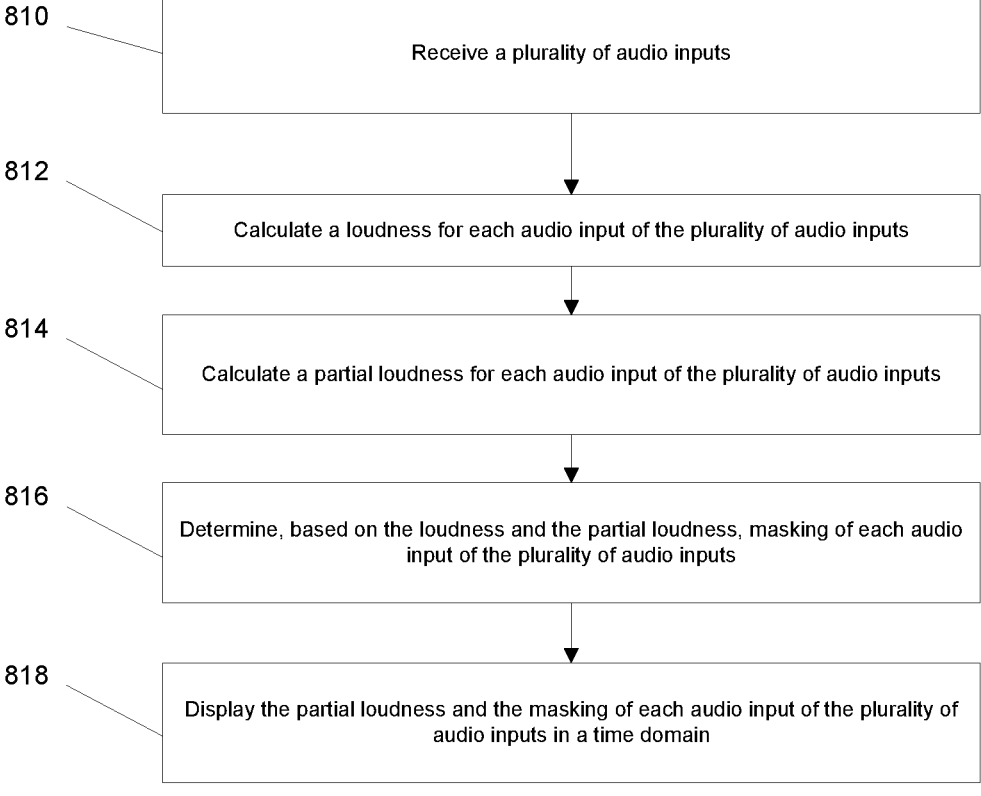

810    Receive a plurality of audio inputs

812    Calculate a loudness for each audio input of the plurality of audio inputs 814    Calculate a partial loudness for each audio input of the plurality of audio inputs 816    Determine, based on the loudness and the partial loudness, masking of each audio input of the plurality of audio inputs 818    Display the partial loudness and the masking of each audio input of the plurality of audio inputs in a time domain

VISUALIZING AUDITORY MASKING IN MULTITRACK AUDIO RECORDING

CROSS-REFERENCE TO RELATED APPLICATIONS

The present application claims the benefit of priority under 35 U.S.C. § 119 from U.S. Provisional Patent Application Ser. No. 63/310,743 entitled "Visualizing Auditory Masking in Multitrack Audio Recording," filed on Feb. 16, 2022, the disclosure of which is hereby incorporated by reference in its entirety for all purposes.

TECHNICAL FIELD

The present disclosure generally relates to audio engineering, and more specifically relates to visualizing auditory masking in multitrack audio recording.

BACKGROUND

Frequency masking is a psychoacoustic effect in which the frequency content in certain bands in one signal overwhelm similar frequencies in another, making that other signal more difficult to hear. In practice, this means that, depending on the amplitude and frequency content of two signals, the presence of one may make another sound quieter than it would be in isolation.

When recording music, each audio source (e.g., guitar, bass, vocals) is typically recorded separately. These recordings, called tracks, are then combined together in a process called mixing. A major objective of mixing is to ensure that each track is heard in an artistically desirable way. The process involves adjusting multiple parameters of each track, including volume, effects, and other processing. The number of tracks and parameters to be adjusted make it a complex process: volume, left-right pan, multiband equalization, reverberation, dynamic processing, and effects on each of 60 tracks includes a multitude of variables. This complexity is compounded by sound changing over time and each variable being adjustable over the course of a song. Finally, because of how human auditory perception works, any change made to one track can affect the audibility of other tracks, possibly at another point in time. The large number of time-varying parameters, the nonlinear way audio signals combine perceptually, and the fact that audio is transient all make multitrack mixing particularly challenging.

The description provided in the background section should not be assumed to be prior art merely because it is mentioned in or associated with the background section. The background section may include information that describes one or more aspects of the subject technology.

SUMMARY

The present disclosure provides systems and methods for displaying visualization of loudness and masking of multitrack audio. For example, the disclosed technology utilizes computational models of human auditory perception to estimate how loud each track will sound in context and visualizes the loudness over time. The disclosed technology also determines when a portion of a track is likely to be masked and identifies such an area. Additionally, the disclosed technology identifies which other tracks are causing masking on a selected track. The disclosed technology utilizes computational models of human auditory perception to visually represent audio in ways that are better aligned with how engineers, or other listeners in general, perceive sound.

According to certain aspects of the present disclosure, a method is provided. The method includes receiving a plurality of audio inputs. The method includes determining masking of each audio input of the plurality of audio inputs. The method includes displaying a perceived loudness and the masking of each audio input of the plurality of audio inputs in a time domain.

According to other aspects of the present disclosure a system is provided. The system includes a memory comprising instructions and a processor configured to execute the instructions which, when executed, cause the processor to receive a plurality of audio inputs. The processor is configured to execute the instructions which, when executed, cause the processor to determine masking of each audio input of the plurality of audio inputs. The processor is configured to execute the instructions which, when executed, cause the processor to display a perceived loudness and the masking of each audio input of the plurality of audio inputs in a time domain.

According to other aspects of the present disclosure a non-transitory machine-readable storage medium comprising machine-readable instructions for causing a processor to execute a method is provided. The method includes receiving a plurality of audio inputs. The method includes determining masking of each audio input of the plurality of audio inputs. The method includes displaying a perceived loudness and the masking of each audio input of the plurality of audio inputs in a time domain.

According to certain aspects of the present disclosure, a method is provided. The method includes receiving a plurality of audio inputs. The method includes calculating a loudness for each audio input of the plurality of audio inputs. The method includes calculating a partial loudness for each audio input of the plurality of audio inputs. The method includes determining, based on the loudness and the partial loudness, masking of each audio input of the plurality of audio inputs. The method includes displaying the partial loudness and the masking of each audio input of the plurality of audio inputs in a time domain.

According to other aspects of the present disclosure a system is provided. The system includes a memory comprising instructions and a processor configured to execute the instructions which, when executed, cause the processor to receive a plurality of audio inputs. The processor is configured to execute the instructions which, when executed, cause the processor to calculate a loudness for each audio input of the plurality of audio inputs. The processor is configured to execute the instructions which, when executed, cause the processor to calculate a partial loudness for each audio input of the plurality of audio inputs. The processor is configured to execute the instructions which, when executed, cause the processor to determine, based on the loudness and the partial loudness, masking of each audio input of the plurality of audio inputs. The processor is configured to execute the instructions which, when executed, cause the processor to display the partial loudness and the masking of each audio input of the plurality of audio inputs in a time domain.

According to other aspects of the present disclosure a non-transitory machine-readable storage medium comprising machine-readable instructions for causing a processor to execute a method is provided. The method includes receiving a plurality of audio inputs. The method includes calculating a loudness for each audio input of the plurality of audio inputs. The method includes calculating a partial loudness for each audio input of the plurality of audio inputs. The method includes determining, based on the loudness and the partial loudness, masking of each audio input of the plurality of audio inputs. The method includes displaying the partial loudness and the masking of each audio input of the plurality of audio inputs in a time domain.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to particular settings, these are examples only and are not to be considered limiting. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 8 illustrates an example process for displaying partial loudness and masking of audio inputs in a multitrack audio recording using the example user device of FIG. 1 or the example system of FIG. 5.

Figure 1:
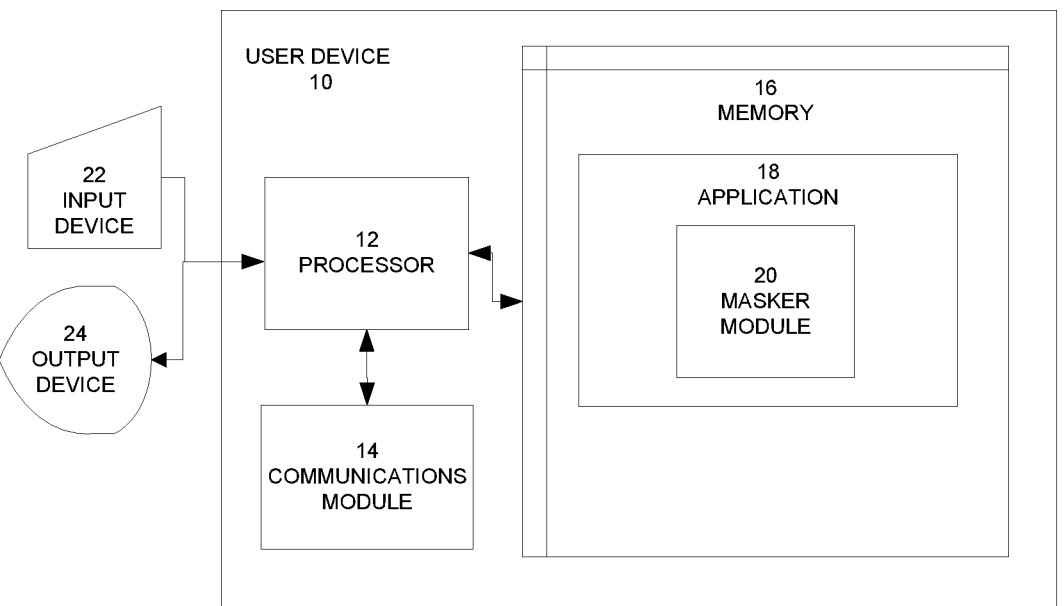
FIG. 1 illustrates a block diagram of an example user device for displaying visualization of loudness and masking of multitrack audio recording.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed systems and methods provide a solution to multitrack mixing tools for audio recordings. For example, the disclosed systems and methods address a technical problem tied to computer technology and arising in the realm of audio engineering, namely the technical problem of identifying masking of a selected track in a mix and visualizing partial loudness in a frequency domain as opposed to a time domain. The disclosed systems and methods solve this technical problem by calculating loudness, partial loudness, and masking throughout a mix, displaying the calculated partial loudness and masking in the time domain, and updating the resultant visualizations of the partial loudness and masking in real time as changes are made to the mix. The disclosed technology provides advantages of displaying masking in the time domain instead of in the frequency domain, which allows convenient identification of where masking is potentially occurring in a mix; displaying post-processing partial loudness (e.g., after all audio manipulation has been applied as known as post-fader partial loudness), which provides more efficient visualization of a mix rather than input audio tracks; and identifying which tracks are causing masking on a given track.

As a brief overview, the disclosed technology receives multiple audio inputs and, for each audio input (i.e., track), calculates loudness (i.e., how loud that audio input sounds in isolation) and partial loudness (i.e., how loud that audio input sounds in context with all of the other audio inputs of the multiple audio inputs) at each time frame on a user interface, determines masking based on the loudness and the partial loudness, and displays partial loudness and masking in the time domain. In certain aspects, the time frame is 50 milliseconds (ms), but any time frame can be used. The disclosed technology displays partial loudness over time, highlights potential instances of masking on the partial loudness timeline (e.g., computed with masked-to-unmasked ratio), and allows selecting a region of a track on the partial loudness timeline to display a spatial layout of how close each of the other audio inputs of the multiple audio inputs is to masking the selected track within that region. The displays of the partial loudness timeline and the masking depict post-fader values (i.e., accounts for the current state of the mix), which is not done in traditional systems. In certain aspects, the disclosed technology can selectively modify each audio input to adjust the masking. Moreover, the displays of the partial loudness timeline and the masking are updated in real-time as changes are made to the mix (e.g., changing levels, panning, or modifying plugin parameters of each audio input).

When a sound is heard in the presence of noise (i.e., background sounds), the perceived loudness of the target signal is called partial loudness. A sound in noise may be partially (or fully) masked, so partial loudness is almost always less than loudness. Partial loudness is a function of both the target and background sounds' excitation levels at frequencies across the spectrum, and can be estimated using computational models of human auditory perception. There are a variety of such models that work in different ways.

Although one model is described below, it should be understood that the disclosure is not limited to this model. In this model, the frequency range of human hearing is divided up into bands (e.g., equivalent rectangular bandwidth (ERB)) and the specific partial loudness of each ERB is calculated in a piecewise function where each piece depends not only on the absolute excitation level of each signal, but on the relationship between the signal and masker (see Equation 1 below). This calculation relies on a number of experimentally determined constants whose values can vary with frequency. For example, in addition to the terms used in computing specific loudness, specific partial loudness adds two more: $T_N$, the threshold of hearing for this signal in the presence of this masker; K, the minimum signal-to-noise ratio of the excitation required to be able to hear the signal when the masking noise has high excitation. $C_2$ is an alternative value of C when both the signal and the masker are loud. As with specific loudness, the values of these terms vary with frequency.

$$M = \frac{N(E_t + E_m)}{N(E_t) + N(E_m)} \qquad (2)$$

An alternative definition of masking is called the masked-to-unmasked ratio (see Equation 3 below). It is the ratio of a signal's partial loudness, $N_{masked}$, to its loudness in quiet, $N_{unmasked}$. As unmasked loudness approaches silence, there is a risk of dividing by 0. As such, $N_{masked}$ or $N_{unmasked}$ is not allowed to fall below the threshold of silence, 0.003 sones.

$$MUR = \frac{\max(N_{masked}, 0.003)}{\max(N_{unmasked}, 0.003)} \qquad (3)$$

As discussed above, the disclosed technology can be implemented in various arrangements with various types of components. While these various implementations are within the scope of the subject technology, the exemplary implementations described below are not intended to be limiting.

FIG. 1 illustrates a block diagram depicting an example user device 10 for displaying visualization of partial loudness and masking of multitrack audio recording. For example, the user device 10 includes a processor 12, a communications module 14, and a memory 16 that includes an application 18 for displaying visualization of partial loudness and masking of multitrack audio recording via a masker module 20. The application 18 can be any appropriate application capable of displaying visualization of $$N'_{SIG}(n) = \begin{cases} \begin{aligned} & C((E_{SIG}(n) + E_{NOISE}(n))G + A)^\alpha - A^\alpha) \\ & -C(((E_{NOISE}(n)(1 + K) + T_Q)G + A)^\alpha - (T_Q G + A)^\alpha) \\ \\ & \times \left(\frac{T_N}{E_{SIG}(n)}\right)^{0.3} \\ \\ & C\left(\frac{2E_{SIG}(n)}{E_{SIG}(n) + T_N}\right)^{1.5} \\ & \times \left(\frac{(T_Q G + A)^\alpha - A^\alpha)}{((E_{NOISE}(n)(1 + K) + T_Q)G + A^\alpha) - (E_{NOISE}(n)G + A)^\alpha)}\right) \\ & \times (((E_{SIG}(n) + E_{NOISE}(n))G + A)^\alpha - (E_{NOISE}(n)G + A)^\alpha) \\ \\ & C_2(E_{SIG}(n) + E_{NOISE}(n))^{0.5} \\ & -C_2((1 + K)E_{NOISE}(n) + T_Q)^{0.5} - (T_Q G + A)^\alpha + A^\alpha) \\ \\ & \times \left(\frac{T_N}{E_{SIG}(n)}\right)^{0.3} \\ \\ & C\left(\frac{2E_{SIG}(n)}{E_{SIG}(n) + T_N}\right)^{1.5} \\ & \times \left(\frac{(T_Q G + A)^\alpha - A^\alpha}{(E_{NOISE}(n)(1 + K) + T_Q)^{0.5} - E_{NOISE}(n)^{0.5}}\right) \\ & \times ((E_{SIG}(n) + E_{NOISE}(n))^{0.5} - E_{NOISE}(n)^{0.5}) \end{aligned} \end{cases} \begin{aligned} & \text{for } E_{SIG}(n) \geq T_Q \text{ and} \\ & \qquad E_{SIG}(n) + E_{NOISE}(n) \leq 10^{10} \\ \\ \\ \\ \\ & \text{for } E_{SIG}(n) < T_N \\ \\ \\ \\ \\ & \text{for } E_{SIG}(n) \geq T_N \text{ and} \\ & \qquad E_{SIG}(n) + E_{NOISE}(n) > 10^{10} \\ \\ \\ \\ & \text{for } E_{SIG}(n) < T_N \text{ and} \\ & \qquad E_{SIG}(n) + E_{NOISE}(n) > 10^{10} \end{aligned} \qquad (1)$$

Masking is a value that represents the extent to which a target sound is masked. Masking can be calculated with various definitions and the present disclosure is not limited to any particular definition. For example, one definition of masking is the ratio of the loudness of the sum of the target and masking excitation patterns to the sum of the loudness of each of the target and masker in quiet (see Equation 2 below).

partial loudness and masking of multitrack audio recording such as, but not limited to, a digital audio workstation (DAW), a browser, an app, and other applications or apps with appropriate capabilities. In aspects where the application 18 is a DAW, for example, the application 18 can include the masker module 20 or support the masker module 20 as a plugin.

The user device 10 can be any endpoint device, for example, a tablet computer, a mobile phone, a mobile computer, a laptop computer, a portable media player, an electronic book (eBook) reader, a desktop computer, or any other device having appropriate processor, memory, and communications capabilities. The processor 12 of the user device 10 is configured to execute instructions, such as instructions physically coded into the processor 12, instructions received from software in the memory 16, or a combination of both. The user device 10 also includes an input device 22, such as a mouse, keyboard, or touch screen, and an output device 24, such as a display.

Figures 2A, 2B:
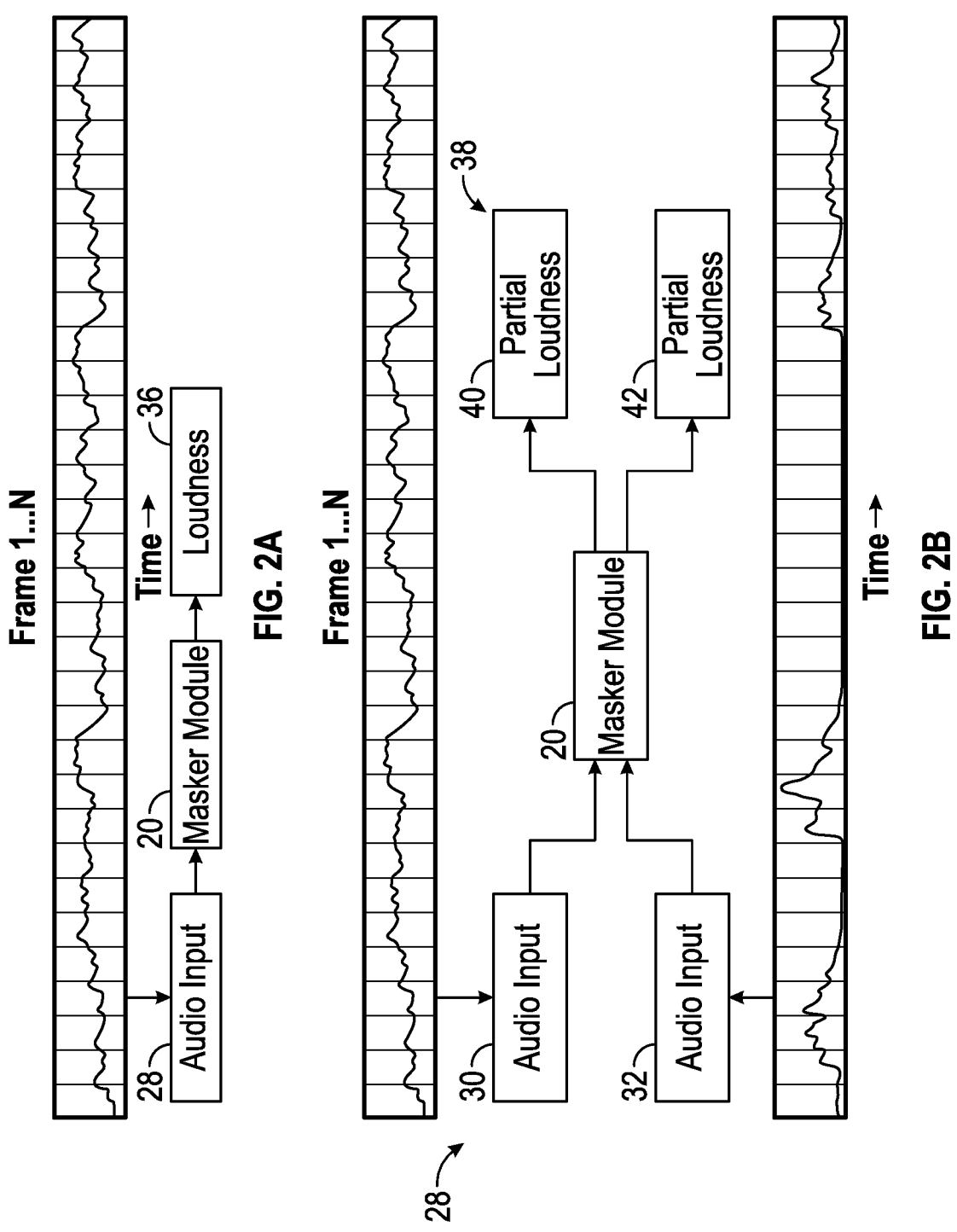
FIG. 2A is a block diagram illustrating computing unmasked loudness of each 50 ms frame.
FIG. 2B is a block diagram illustrating computing partial loudness of each 50 milliseconds (ms) frame.

With reference to FIGS. 1, 2A, 2B, and 3A, the masker module 20 is configured to receive a multitrack audio recording 26, which includes at least one audio input 28 (e.g., track) such as a first audio input 30, a second audio input 32 . . . to an nth audio input. As depicted in FIG. 2A, the masker module 20 is configured to calculate a loudness 36 of each audio input of the at least one audio input 28, such as the first audio input 30. As depicted in FIG. 2B, the masker module 20 is configured to calculate a partial loudness 38 of each audio input of the at least one audio input 28 (e.g., how loud that audio input sounds in context with all of the other audio inputs of the at least one audio input 28), such as, for example, a first partial loudness 40 and a second partial loudness 42 of the first audio input 30 and the second audio input 32, respectively. In certain aspects, the masker module 20 slices each audio input of the at least one audio input 28 into 50 ms frames, and calculates the loudness 36 and the partial loudness 38 of each frame.

Figure 3A:
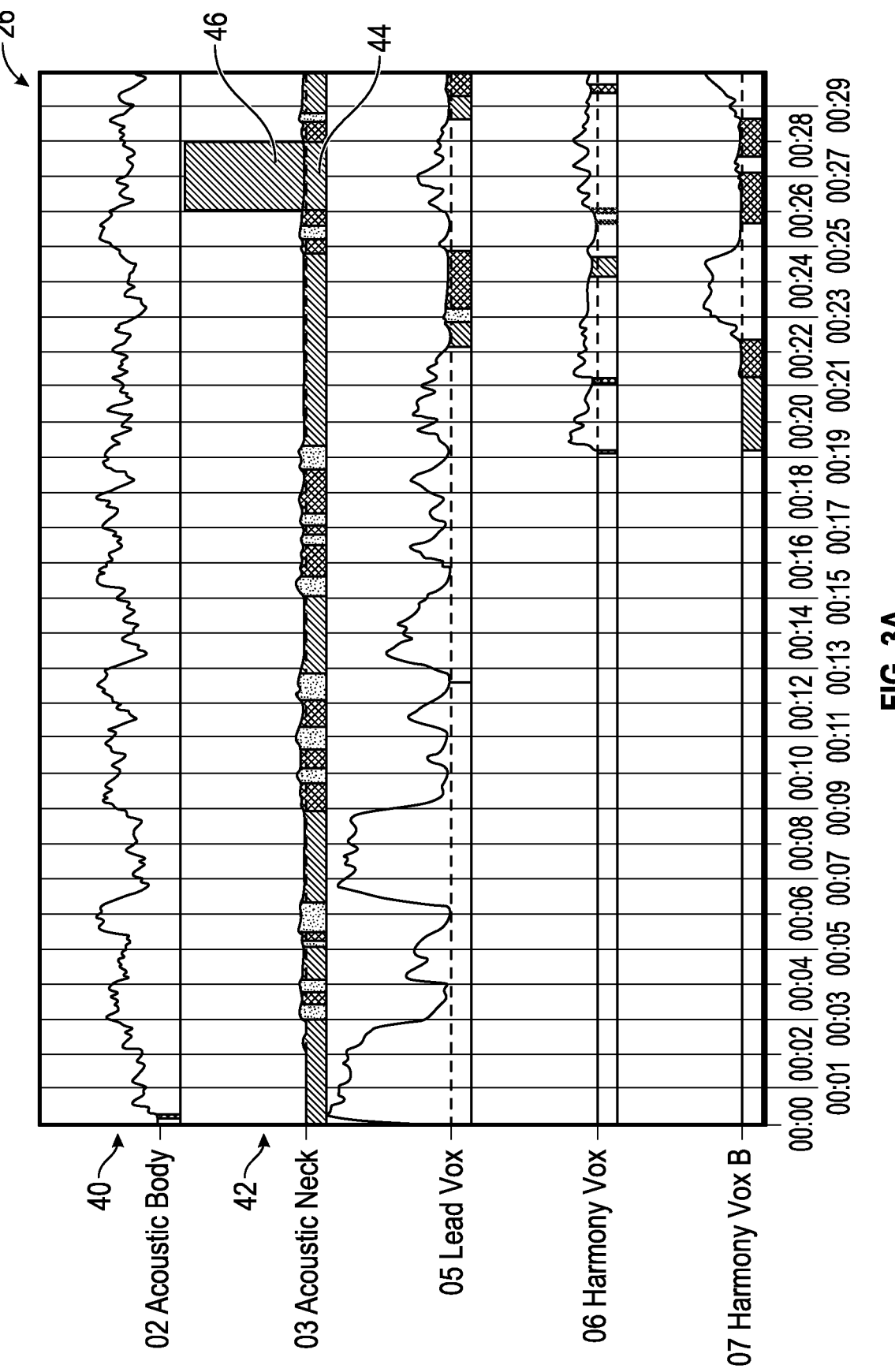
FIG. 3A is a graph illustrating a display of how loud each audio input sounds to a human listener in a timeline and track-based layout depicting partial loudness with portions of potential masking highlighted and a region of the partial loudness being selected.

The masker module 20 is configured to determine masking 44 (shown in FIG. 3A) of each audio input of the at least one audio input 28 based on the loudness 36 and the partial loudness 38 that is calculated. In certain aspects, the masking 44 is determined with Equation 3 above, but is not limited to Equation 3 as other methods of determining the masking 44 are within the scope of the subject technology. The masker module 20 is configured to display the partial loudness 38 and the corresponding masking 44 of each audio input of the at least one audio input 28 in the time domain. In certain aspects, time is represented on the horizontal axis and the partial loudness 38 is represented on the vertical axis, but is not limited to such an arrangement. The masking 44 of the second audio input 32, for example, is depicted as highlighting below the second partial loudness 42, as illustrated in FIG. 3A. In certain aspects, the masker module 20 is configured to highlight the partial loudness 38 with the corresponding masking 44 of each audio input of the at least one audio input 28 where the masked-to-unmasked ratio falls below 10%. In certain aspects, the highlighted regions are identified as a gradient that increases in opacity as the predicted amount of masking increases.

The second partial loudness 42 and the masking 44 of the second audio input 32 can be interactively displayed, for example, on the output device 24 of the user device 10. The partial loudness 38 and the corresponding masking 44 of each audio input of the at least one audio input 28 is similarly displayed interactively on the output device 24 of the user device 10. By displaying the partial loudness 38 across time, a user of the user device 10 can understand the impact of changing a mix at one point in a song will have on the rest of the song (e.g., the multitrack audio recording 26). Displaying the partial loudness 38 across time also makes it easier to identify likely problem areas more efficiently (e.g., at a glance of the output device 24).

Figure 3B:
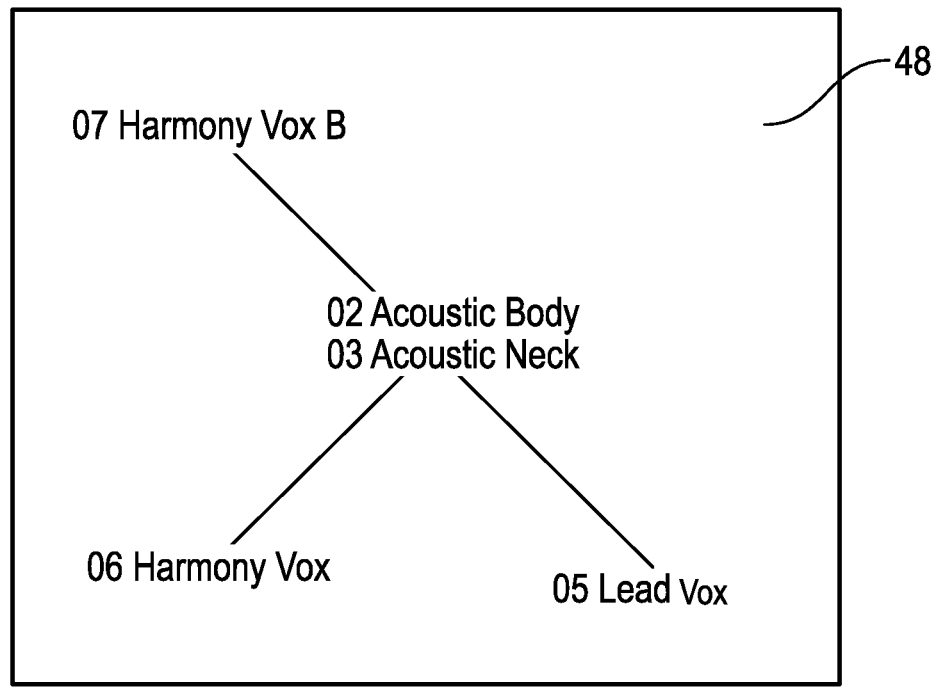
FIG. 3B is an exemplary visual representation illustrating how sonically on top of the selected audio input each of the other audio inputs is using relative spatial distance.

With the partial loudness 38 and the corresponding masking 44 of each audio input of the at least one audio input 28 interactively displayed on the output device 24, for example, the masker module 20 is configured to, responsive to user input via the input device 22, identify a selected region 46 (see FIG. 3A) of the partial loudness 38 of an audio input (e.g., the partial loudness 42 of the second audio input 32) of the at least one audio input 28. With reference to FIG. 3B, the masker module 20 is configured to identify and display audio inputs of the at least one audio input 28 that are most likely masking the selected audio input in the selected region 46, and is configured to display on the output device 24, for example, a visual representation 48 of the masking 44 in the selected region 46 of the selected audio input with respect to the other audio inputs of the at least one audio input 28. The visual representation 48 corresponds to the selected region 46 and depicts the audio inputs, that are identified as most likely masking, at a relative distance away from a selected audio input (e.g., the second audio input 32) based on the amount of masking. That is, the relative distance is determined by how much the audio input masks the selected audio input (e.g., the second audio input 32). In certain aspects, for example, the selected audio input can be illustrated in a central location with the audio inputs that are identified as masking arranged at a relative distance away from the selected audio input (e.g., an audio input that is arranged further away from the selected audio input is masking the selected audio input less than an audio input that is arranged closer to the selected audio input). It should be understood that while the visual representation 48 is exemplarily depicted as a cluster diagram layout, other two-dimensional visual representations such as a ladder layout, a tree layout, and other layouts are also within the scope of the subject technology.

Figure 4A:
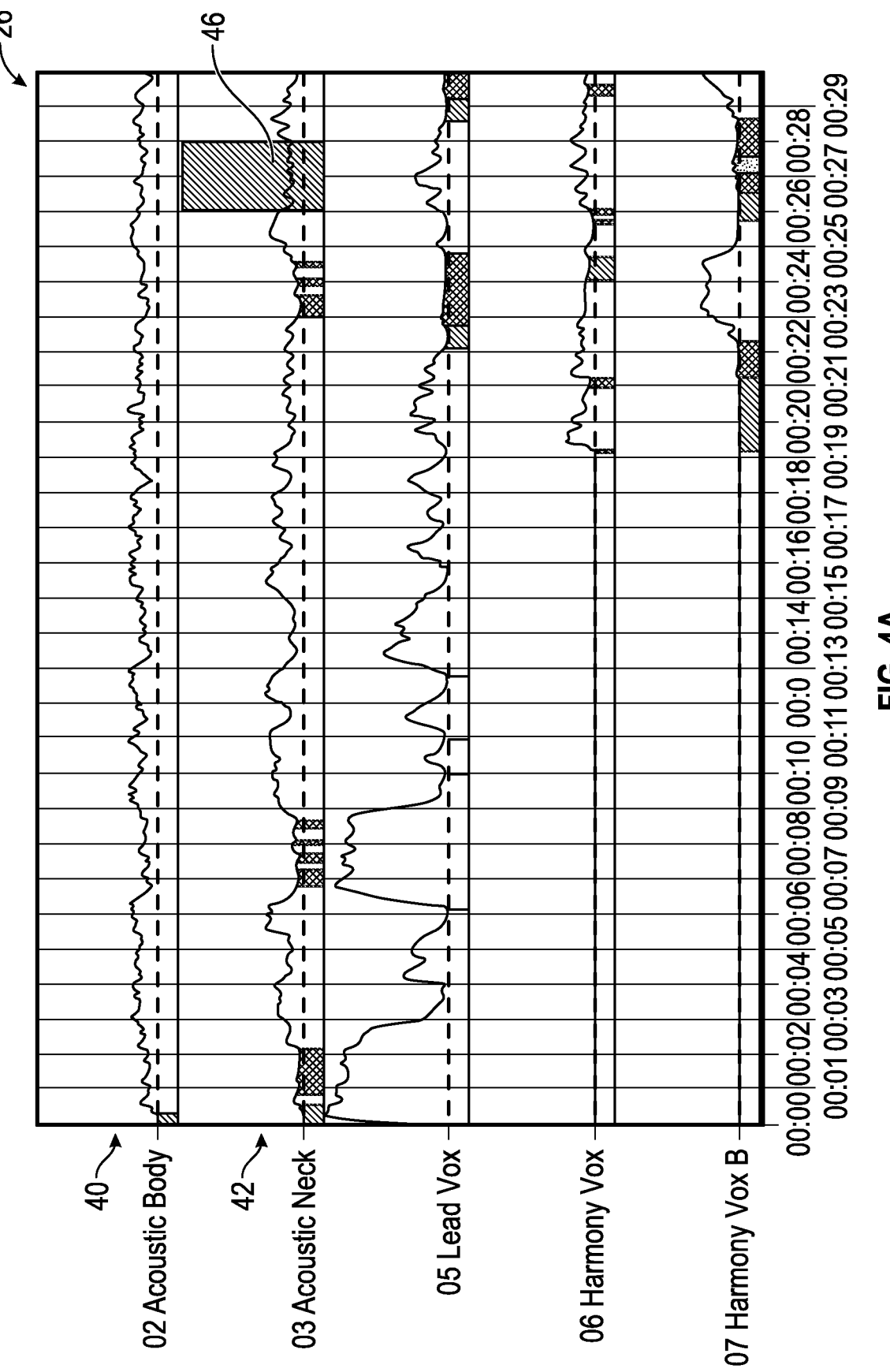
FIG. 4A is a graph illustrating the display with an adjustment reducing the masking of the selected audio input of FIG. 3A and the selected region of the partial loudness of the selected audio input being identified as having reduced masking.
Figure 4B:
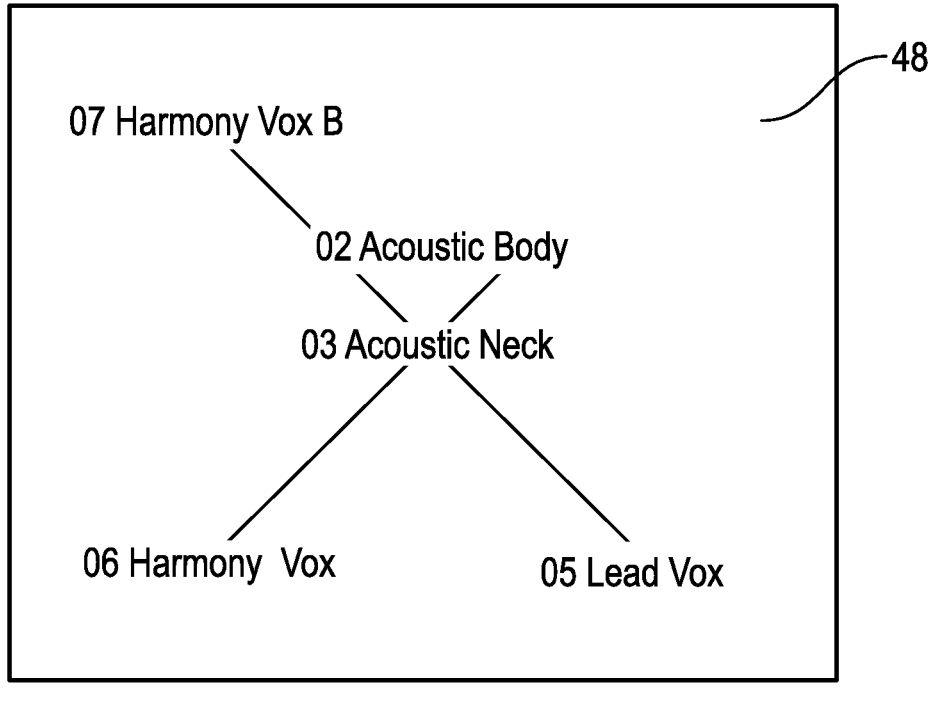
FIG. 4B is an exemplary visual representation illustrating the adjustment to the audio input masking the selected audio input as being farther away from the selected audio input.

In certain aspects, the masker module 20 is configured, responsive to user input via the input device 22, to adjust parameters of each audio input of the at least one audio input 28. For example, during a mix, a user can adjust parameters such as, but not limited to, level (e.g., volume), left-right pan, multiband equalization, reverberation, dynamic compression, and other parameters, to modify masking of a selected audio input. As shown in FIG. 3A, for example, the second audio input 32 is masked and the selected region 46 has been selected by a user to visualize which other audio inputs are masking the second audio input 32, as illustrated in the visual representation 48 of FIG. 3B, which depicts the first audio input 30 at a relative distance that is very close to the second audio input 32 (e.g., the first audio input 30 is masking the second audio input 32 comparably more than the other audio inputs). Responsive to the user adjusting parameters of each audio input to reduce masking on the second audio input 32, the masker module 20 displays the selected region 46 of the second audio input 32 without highlighting to indicate that masking is reduced, as illustrated in FIG. 4A, and also displays the visual representation 48, in FIG. 4B, depicting the first audio input 30 further away from the second audio input 32 because its masking has been reduced. The masker module 20 is configured to display a current state of the partial loudness 38 and the corresponding masking 44 of the at least one audio input 28 as adjustments to the parameters are made in real time.

Figure 5:
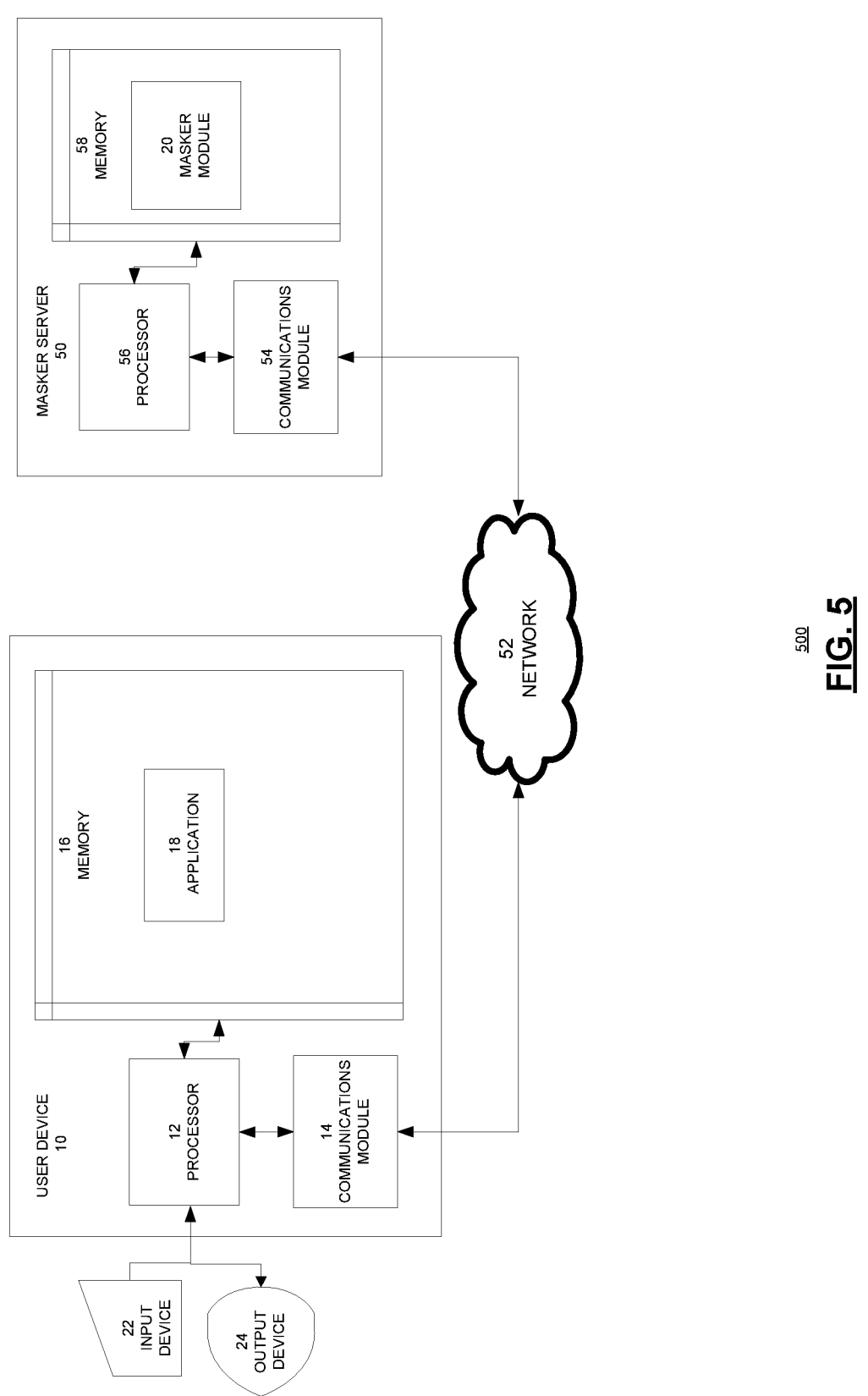
FIG. 5 illustrates a block diagram of an example system for displaying visualization of loudness and masking of multitrack audio recording.

FIG. 5 is a block diagram illustrating an example system 500 for displaying visualization of partial loudness and masking of multitrack audio recording. The system 500 includes the user device 10 and a masker server 50.

The user device 10 and the masker server 50 are connected over a network 52 via respective communications modules 14, 54. The communications modules 14, 54 are configured to interface with the network 52 to send and receive information, such as data, requests, responses, and commands to other devices on the network 52. The communications modules 14, 54 can be, for example, modems or Ethernet cards.

The network 52 can include, for example, any one or more of a personal area network (PAN), a local area network (LAN), a campus area network (CAN), a metropolitan area network (MAN), a wide area network (WAN), a broadband network (BBN), the Internet, and the like. Further, the network 52 can include, but is not limited to, any one or more of the following network topologies, including a bus network, a star network, a ring network, a mesh network, a star-bus network, tree or hierarchical network, and the like.

The masker server 50 includes a processor 56, the communications module 54, and a memory 58 hosting the masker module 20. The processor 56 of the masker server 50 is configured to execute instructions, such as instructions physically coded into the processor 56, instructions received from software in the memory 58, or a combination of both. The masker server 50 may correspond to one or more servers.

The user device 10 of FIG. 5 is similar to the one depicted in FIG. 1 and includes the application 18 except the masker module 20 is hosted on the masker server 50 instead, as mentioned above. In certain aspects, the masker module 20 receives the multitrack audio recording 26 from the user device 10. The masker module 20 is configured to communicated with the application 18 over the network 52 to perform functions on the user device 10 as described above with reference to FIGS. 1-4B.

Figure 6:
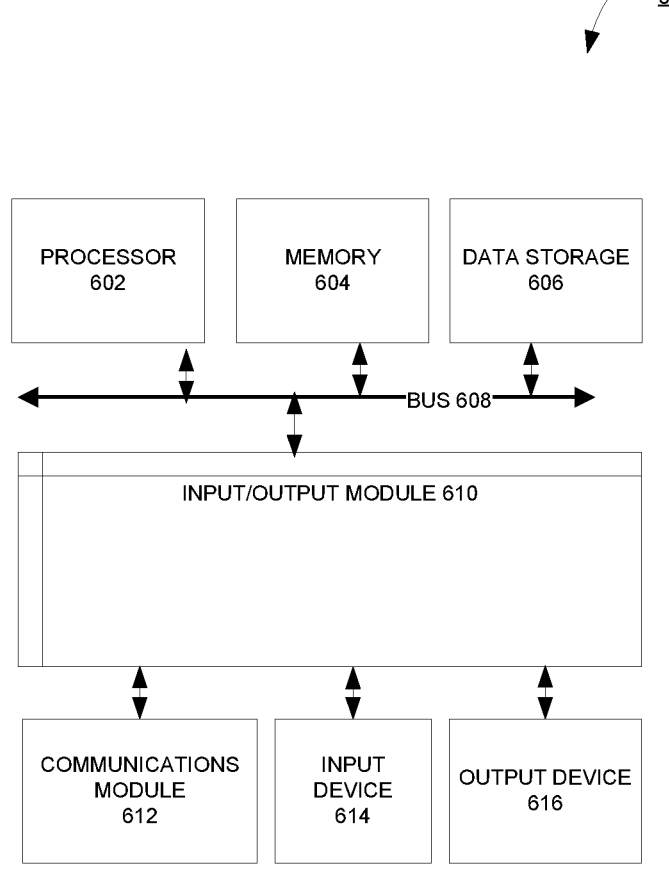
FIG. 6 is block diagram illustrating an example computer system with which the user device and the masker server can be implemented.

FIG. 6 is a block diagram illustrating an example computer system 600 with which the user device 10 and the masker server can be implemented. In certain aspects, the computer system 600 may be implemented using hardware or a combination of software and hardware, either in a dedicated server, or integrated into another entity, or distributed across multiple entities.

Computer system 600 (e.g., the user device 10, the masker server 50) includes a bus 608 or other communication mechanism for communicating information, and a processor 602 (e.g., the processor 12, 56) coupled with bus 608 for processing information. According to one aspect, the computer system 600 can be a cloud computing server of an IaaS that is able to support PaaS and SaaS services.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., the memory 16, 58), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, e.g., one or more modules of computer program instructions encoded on a computer readable medium for execution by, or to control the operation of, the computer system 600.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. In addition, input/output module 610 may be provided in communication with processor 602, so as to enable near area communication of computer system 600 with other devices. The input/output module 610 may provide, for example, for wired communication in some implementations, or for wireless communication in other implementations, and multiple interfaces may also be used. The input/output module 610 is configured to connect to a communications module 612. Example communications modules 612 (e.g., the communications module 14, 54) include networking interface cards, such as Ethernet cards and modems.

In certain aspects, the input/output module 610 is configured to connect to a plurality of devices, such as an input device 614 (e.g., the input device 22) and/or an output device 616 (e.g., the output device 24). Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device.

According to one aspect of the present disclosure the user device 10 and the masker server 50 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. Processor 602 may process the executable instructions and/or data structures by remotely accessing the computer program product, for example by downloading the executable instructions and/or data structures from a remote server through communications module 612 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 608. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

Figure 7:
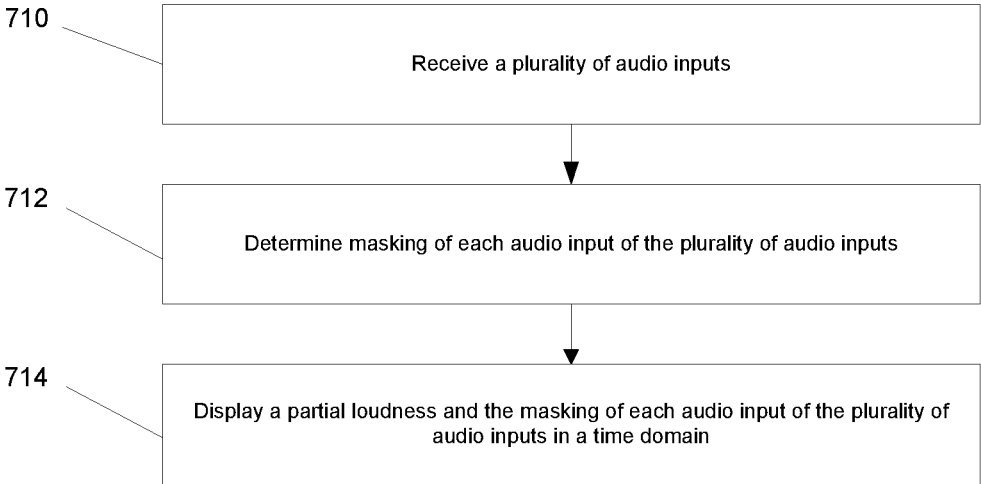
FIG. 7 illustrates an example process for displaying perceived loudness and masking of audio inputs in a multitrack audio recording using the example user device of FIG. 1 or the example system of FIG. 5.

FIG. 7 illustrates an example process 700 for displaying perceived loudness and masking of audio inputs in a multitrack audio recording using the example user device 10 of FIG. 1. While FIG. 7 is described with reference to FIG. 1, it should be noted that the process steps of FIG. 7 may be performed by other systems, such as the example system illustrated in FIG. 5.

The process 700 begins by proceeding to step 710 when the masker module 20 on the user device 10 or the masker server 50 receives a plurality of audio inputs 28. As depicted at step 712, the masker module 20 on the user device 10 or the masker server 50 determines masking 44 of each audio input of the plurality of audio inputs 28. As depicted at step 714, the masker module 20 on the user device 10 or the masker server 50 displays the perceived loudness (e.g., partial loudness 38) and the masking 44 of each audio input of the plurality of audio inputs 28 in a time domain.

FIG. 8 illustrates an example process 800 for displaying partial loudness and masking of audio inputs in a multitrack audio recording using the example user device 10 of FIG. 1. While FIG. 8 is described with reference to FIG. 1, it should be noted that the process steps of FIG. 8 may be performed by other systems, such as the example system illustrated in FIG. 5.

The process 800 begins by proceeding to step 810 when the masker module 20 on the user device 10 receives a plurality of audio inputs 28. As depicted at step 812, the masker module 20 on the user device 10 calculates a loudness 36 for each audio input of the plurality of audio inputs 28. As depicted at step 814, the masker module 20 on the user device 10 calculates a partial loudness 38 for each audio input of the plurality of audio inputs 28. The masker module 20 on the user device 10 determines, based on the loudness 36 and the partial loudness 38, masking 44 of each audio input of the plurality of audio inputs 28, as illustrated at step 816. As depicted at step 818, the masker module 20 on the user device 10 displays the partial loudness 38 and the masking 44 of each audio input of the plurality of audio inputs 28 in a time domain.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for displaying perceived loudness and masking of audio inputs in a multitrack audio recording, the method comprising:
   receiving a plurality of audio inputs;
   determining masking of each audio input of the plurality of audio inputs;
   displaying the perceived loudness and the masking of each audio input of the plurality of audio inputs in a time domain;
   identifying, responsive to input received from an input device, a selected region of the perceived loudness of a selected audio input of the plurality of audio inputs; and
   displaying a visual representation of the masking, in the selected region, of the selected audio input, wherein the visual representation depicts other audio inputs of the plurality of audio inputs at a relative distance away from the selected audio input based on amount of masking.

2. The method of claim 1, wherein the perceived loudness for each audio input of the plurality of audio inputs is calculated at time frames of 50 milliseconds.

3. The method of claim 1, further comprising:
   displaying the masking of each audio input as a highlight when a masked-to-unmasked ratio is below ten percent.

4. The method of claim 1, wherein the perceived loudness and the masking of each audio input of the plurality of audio inputs is displayed interactively.

5. The method of claim 1, wherein the visual representation is one of a cluster diagram layout, a ladder layout, and a tree layout.

6. The method of claim 1, further comprising:
   displaying a current state of the perceived loudness and the masking of each audio input of the plurality of audio inputs in the time domain as adjustments to parameters of the plurality of audio inputs are made in real time.

7. A system for displaying perceived loudness and masking of audio inputs in a multitrack audio recording, the system comprising:
   a memory comprising instructions;
   a processor configured to execute the instructions which, when executed, cause the processor to:
   receive a plurality of audio inputs;
   determine masking of each audio input of the plurality of audio inputs;

display the perceived loudness and the masking of each audio input of the plurality of audio inputs in a time domain;

identify, responsive to input received from an input device, a selected region of the perceived loudness of a selected audio input of the plurality of audio inputs; and display a visual representation of the masking, in the selected region, of the selected audio input, wherein the visual representation depicts other audio inputs of the plurality of audio inputs at a relative distance away from the selected audio input based on amount of masking.

8. The system of claim 7, wherein the perceived loudness for each audio input of the plurality of audio inputs is calculated at time frames of 50 milliseconds.

9. The system of claim 7, wherein the processor is further configured to execute the instructions which, when executed, cause the processor to:

display the masking of each audio input as a highlight when a masked-to-unmasked ratio is below ten percent.

10. The system of claim 7, wherein the perceived loudness and the masking of each audio input of the plurality of audio inputs is displayed interactively.

11. The system of claim 8, wherein the visual representation is one of a cluster diagram layout, a ladder layout, and a tree layout.

12. The system of claim 7, wherein the processor is further configured to execute the instructions which, when executed, cause the processor to:

display a current state of the perceived loudness and the masking of each audio input of the plurality of audio inputs in the time domain as adjustments to parameters of the plurality of audio inputs are made in real time.

13. A non-transitory machine-readable storage medium comprising machine-readable instructions for causing a processor to execute a method for displaying perceived loudness and masking of audio inputs in a multitrack audio recording, the method comprising:

receiving a plurality of audio inputs;

determining masking of each audio input of the plurality of audio inputs;

displaying the perceived loudness and the masking of each audio input of the plurality of audio inputs in a time domain;

identifying, responsive to input received from an input device, a selected region of the perceived loudness of a selected audio input of the plurality of audio inputs; and displaying a visual representation of the masking, in the selected region, of the selected audio input, wherein the visual representation depicts other audio inputs of the plurality of audio inputs at a relative distance away from the selected audio input based on amount of masking.

14. The non-transitory machine-readable storage medium of claim 13, wherein the perceived loudness for each audio input of the plurality of audio inputs is calculated at time frames of 50 milliseconds.

15. The non-transitory machine-readable storage medium of claim 13, further comprising:

displaying the masking of each audio input as a highlight when a masked-to-unmasked ratio is below ten percent.

16. The non-transitory machine-readable storage medium of claim 13, wherein the perceived loudness and the masking of each audio input of the plurality of audio inputs is displayed interactively.

17. The non-transitory machine-readable storage medium of claim 13, further comprising:

displaying a current state of the perceived loudness and the masking of each audio input of the plurality of audio inputs in the time domain as adjustments to parameters of the plurality of audio inputs are made in real time.

\* \* \* \* \*